(12) United States Patent
Rogers et al.

(10) Patent No.: US 8,122,058 B2
(45) Date of Patent: *Feb. 21, 2012

(54) CONFIGURING VARIABLES

(75) Inventors: Steven W. Rogers, Austin, TX (US);
Ross E. Houston, Cedar Park, TX (US)

(73) Assignee: National Instruments Corporation,
Austin, TX (US)

( * ) Notice: Subject to any disclaimer, the term of this patent is extended or adjusted under 35 U.S.C. 154(b) by 547 days.

This patent is subject to a terminal disclaimer.

(21) Appl. No.: 12/272,367

(22) Filed: Nov. 17, 2008

(65) Prior Publication Data

US 2009/0070736 A1 Mar. 12, 2009

Related U.S. Application Data

(63) Continuation of application No. 11/037,575, filed on Jan. 18, 2005, now Pat. No. 7,593,944.

(60) Provisional application No. 60/602,214, filed on Aug. 17, 2004.

(51) Int. Cl.
*G06F 9/44* (2006.01)
*G06F 15/177* (2006.01)

(52) U.S. Cl. ......... 707/796; 715/735; 717/105; 717/113
(58) Field of Classification Search .................. None
See application file for complete search history.

(56) References Cited

U.S. PATENT DOCUMENTS

| | | | |
|---|---|---|---|
| 6,076,952 A * | 6/2000 | Gretta et al. ................ 700/83 |
| 6,216,237 B1 | 4/2001 | Klemm et al. |
| 6,233,726 B1 | 5/2001 | Bowman et al. |
| 6,546,433 B1 | 4/2003 | Matheson |
| 6,690,390 B1 | 2/2004 | Walters et al. |
| 6,754,885 B1 * | 6/2004 | Dardinski et al. ........... 717/113 |
| 6,826,432 B2 | 11/2004 | Beck et al. |
| 7,415,704 B2 | 8/2008 | Schmidt et al. |
| 7,593,944 B2 * | 9/2009 | Rogers et al. ..................... 1/1 |
| 2002/0184610 A1 * | 12/2002 | Chong et al. ................ 717/109 |
| 2003/0074634 A1 * | 4/2003 | Emmelmann ............... 715/513 |
| 2005/0028107 A1 | 2/2005 | Gomes et al. |
| 2005/0065990 A1 * | 3/2005 | Allen ......................... 708/495 |
| 2005/0076002 A1 | 4/2005 | Williams et al. |
| 2007/0179641 A1 | 8/2007 | Lucas et al. |

* cited by examiner

*Primary Examiner* — Shyue Jiunn Hwa
(74) *Attorney, Agent, or Firm* — Meyertons Hood Kivlin Kowert & Goetzel, P.C.; Jeffrey C. Hood; Mark S. Williams

(57) ABSTRACT

System and method for creating, configuring, representing, and using variables in programs. A graphical user interface (GUI) may be displayed in response to user input requesting creation and/or configuration of a variable for use in or comprised in one or more programs, e.g., on various devices. User input is received to the GUI configuring attributes of the variable, including: name, data type, and/or scope (e.g., local, global, or network). The configured attributes are stored and optionally displayed, e.g., in a resource tree, and the variable in each of the programs updated in accordance with the configured attributes. When at least one of the programs is incompatible with the configured variable, an error condition may be indicated, e.g., by providing information relating to portions of the program that are incompatible with the configured variable. The program may be modified in response to user input for compatibility with the configured variable.

17 Claims, 9 Drawing Sheets

CONFIGURING VARIABLES

CONTINUATION AND PRIORITY DATA

This application is a continuation of U.S. application Ser. No. 11/037,575 titled "Variable Abstraction", filed Jan. 18, 2005 now U.S. Pat. No. 7,593,944, whose inventors are Steven W. Rogers and Ross E. Houston, which claims benefit of priority to U.S. Provisional Application Ser. No. 60/602,214 titled "Variable Abstraction", filed Aug. 17, 2004, whose inventors are Steven W. Rogers, Robert E. Dye, and Ross E. Houston, both of which are hereby incorporated by reference in their entirety as though fully and completely set forth herein.

FIELD OF THE INVENTION

The present invention relates to the field of programming, and more particularly to a system and method for creating, configuring, representing, and using variables in programs.

DESCRIPTION OF THE RELATED ART

The use of variables is a fundamental part of software programming. As is well known, the term "variable" generally refers to a named memory location in which a program can store intermediate results and from which it can then read them. Each programming language has different rules about how variables can be named, typed, and used. Typically, a value is "assigned" to a variable in an assignment statement or during initialization. Variables may be of various types, including, for example, such intrinsic data types as integer, Boolean, character, and float (real), among others. Many languages also allow user-defined types, where, for example, a user may define a structure or class as a new data type, and instantiate variables of that type. Thus, a type may specify a single ("atomic") value or a collection ("aggregate") of values of the same or different types.

A variable generally has a name, whereby the variable may be specified or referred to in and by program instructions, and which may provide a mnemonic for users indicating the nature or content of the variable. A variable's type specifies the size (e.g., in bits) of the storage needed to store the variable's contents, and generally does not change. Variables also typically have a scope, which refers to the region of program source within which it represents a specified datum or data object. Most programming languages support both local and global variables.

When users develop programs that share data, there are numerous decisions they must make regarding variable attributes, e.g., type and scope. For example, if they are sharing the data between different loops in the same program, they may use local variables. For sharing data between programs running on the same machine they may use global variables. For sharing data across machines, i.e., over a network, there are many different techniques and application programming interfaces (APIs) available, including, for example, DataSocket, TCP/IP, and Logos. However, if the developer changes his mind and decides that data shared in one scope really should be shared in a different scope (i.e., a global variable that really should be shared across machines) a significant rewrite of the programs is generally required. Similarly, a change in the data type of a shared variable used in different programs, possibly across multiple machines, may entail substantial reworking of the program code.

For example, there are many different ways to share data or communicate between two independent loops in a program. If the two loops are in the same program a local variable may be appropriate. If the two loops are in different programs, but on the same machine and in the same process, global variables may be used. If the two programs are in different processes or on different machines there are a number of different application programming interfaces (APIs) and protocols to choose from including (but not limited to) raw TCP, raw UDP, DataSocket, Logos, RT protocol, or VISA.

The communication mechanism chosen by a user may depend on the communication characteristics desired as well as the execution target of a program. Examples include:

1. When sharing data between two different programs a user cannot use a local variable which may be only valid for sharing data within a single program.
2. When sharing data from within a time critical loop on a real-time target, e.g., on a LabVIEW Real-time target, the user may utilize real time first-in, first-out buffers (RT-FIFOs) to reduce the jitter generated.
3. When sharing data from a programmable hardware element based device, such as a field programmable gate array (FPGA) device, a user may not be able to use TCP or DataSocket, as they may not be supported on these (e.g., FPGA based) devices.

Thus, it may be difficult for the user to know or decide which of these mechanisms to use for such data communications. Generally, users rewrite portions of their application or applications if they need to switch mechanisms for additional functionality or to run on different targets. For example, if a user writes an application that shares data between two loops the user may utilize global variables.

FIG. 1A illustrates a prior art use of a global variable for sharing data between two loops in a graphical program, in this particular case, a LabVIEW block diagram, as may be developed in the LabVIEW graphical program development environment provided by National Instruments Corporation. It should be noted that this approach also applies to text-based programs, such as, for example, programs written in C, C++, JAVA, and so forth.

As FIG. 1A shows, in the top loop, a global variable "Temperature" is declared, where the global scope is indicated by the "globe" icon. As FIG. 1A also shows, the variable is also used in the bottom loop, thus, the value of the global variable is accessible by program code in both loops.

However, if the user then needs for the loops to run on two different machines, the use of global variables no longer suffices. In one prior art approach, the user may utilize an inter-machine communication mechanism, such as, for example, DataSocket, as is well known in the art. Since the APIs for global variables and DataSocket are entirely different, the user may be required to rewrite the loops. For example, FIG. 1B illustrates the graphical program of FIG. 1A, but modified to use DataSocket instead of the global variable, according to one prior art approach.

As FIG. 1B shows, for each loop, the DataSocket is declared, i.e., as a Write or a Read, whereby the temperature data may be shared between the loops.

However, as indicated, each of these approaches requires the user to write or modify the application specifically to implement the desired communication scheme. As noted above, if the communication scheme is used for numerous programs, possibly across many machines, changing the scheme may be difficult, tedious, and error prone.

Thus, improved systems and methods for specifying, representing, and using variables are desired.

SUMMARY OF THE INVENTION

One embodiment of the present invention comprises a system and method for specifying, representing, and using variables in programs. The methods described may be used in conjunction with any of various computer systems or devices, including multiple devices coupled over a network.

A graphical user interface (GUI) may be displayed in response to user input requesting configuration of a variable, where the variable is included in one or more programs. The programs may be text-based programs or graphical programs, and may be on a single machine or on a plurality of devices coupled via a network.

User input to the GUI configuring attributes of the variable may be received. In preferred embodiments, the attributes may include one or more of: name, data type, and scope. In one embodiment, the scope may be specified as local, global, or network, where network scope refers to a variable scope spanning a plurality of machines coupled together over a network. The GUI may include various fields for specifying these attributes, for example, the user may specify a variable with the name "Temperature", of data type "Double", and with "Network" scope. In some embodiments, additional (optional) fields or controls may also be provided. For example, depending upon the attributes specified, e.g., data type or scope, options or fields for specifying additional attributes, e.g., buffer size, may be presented. Thus, in some embodiments, the GUI may display different and/or additional fields or controls based on the specified attributes.

The configured attributes may then be stored, e.g., in non-volatile memory and/or RAM of a host computer, or of another computer or device coupled to the computer, e.g., over a network.

Finally, the variable may be updated in each of the one or more programs in accordance with the configured attributes. In other words, everywhere the variable has been referenced, i.e., in different programs, possibly across multiple devices over the network, the instances of the variable, along with any underlying implementation mechanisms and/or protocols, may be automatically updated to reflect the specified configuration.

In some cases, at least one of the one or more programs may be incompatible with the configured variable, in which case an error condition may be indicated for the at least one of the one or more programs. For example, in one embodiment, indicating an error condition for the at least one of the one or more programs may include providing information relating to one or more portions of the program that are incompatible with the configured variable. The at least one of the one or more programs may then be modified in response to user input, where the modified at least one program is compatible with the configured variable. Said another way, if an error is reported or otherwise indicated for one or the program instances due to incompatibility with the new variable configuration, the user may edit the program to correct the error condition. Of course, in some cases the user may also re-configure the variable, i.e., configure the variable differently, to remove the error condition.

The error condition may be indicated in any of a variety of ways. For example, a text message describing the error may be presented to the user, or an error code presented, whereby the user may look up the error description. In some embodiments, the error may be indicated graphically, e.g., if the method determines that there are incompatible or invalid portions of the program, the incompatible portions may be graphically indicated, e.g., the graphical program may be displayed with broken wires indicating the incompatible portion or portions. In other embodiments, the incompatible portions may be indicated via modified icons, color-coding, shading, boundary lines, or via any other type of graphical indicator. In yet another embodiment, the invalid portions may be indicated via text, e.g., via labels displayed next to the respective portions, and so forth.

In one embodiment, information indicating how the incompatible portions can be modified or replaced to enable proper use of the variable may be provided to the user, after which the user may modify the program accordingly.

In some embodiments, the basic approach described above may also be used to create and specify the variable. In other words, in some embodiments, the method may also include creating the variable, e.g., with default or user-specified attributes. For example, creating the variable may include displaying the graphical user interface (GUI) in response to user input requesting creation of the variable. In some embodiments, the variable may be created with a default configuration of the attributes of the variable. If the user is satisfied with the default variables, no further configuration may be necessary. However, if there is no default configuration, or if further configuration is required, then, as described above, user input to the GUI may be received specifying the attributes of the variable. As described above, the attributes may include one or more of: name, data type, and scope. The specified (or default) attributes may be stored.

Once the variable has been specified, a representation of the variable may be displayed, where the variable is selectable via the representation for inclusion in the one or more programs. For example, the representation of the variable may include the name of the variable and/or an icon for the variable.

Thus, once the variable has been specified, the variable may be instantiated, and included in the one or more programs in response to user input, e.g., with a simple single point API. Note that regardless of the configuration changes made to the variable, the usage (reference) in the program(s), e.g., in or on the block diagram(s) may always be the same. In other words, the usage of the variable may not change, even if the underlying implementation of the variable changes.

Thus, for example, in a graphical program embodiment, the underlying implementation for a variable may be scripted under the node visible to the user. If a user creates a variable and specifies a global scope, the underlying implementation may use a traditional global variable. If a user selects a network scope, the underlying implementation may use a mechanism and protocol accordingly, e.g., DataSocket or Logos. Once the variable has been configured and deployed, or deployed and configured, the program or programs that include or utilize the configured variable may be executed, where the variable usages (references) or instances in each program exist and behave in accordance with the configuration. As noted above, the program or programs may be text-based or graphical, and may be directed to any type of application domain, as desired. For example, the program may be operable to perform one or more of: an industrial automation function, a process control function, and/or a test and measurement function, although the techniques disclosed herein may be used in any other application domain as well.

In some embodiments, displaying a representation of the variable may include displaying the representation of the variable in a window, where the representation is selectable via user input to the window. For example, the GUI may include a window for displaying and editing a program or programs, as well as a project window which may display resources related to or useable by or in the program(s). For example, the project window may display software resources, e.g., in a "source" tree, and may further display hardware resources, e.g., in a "system definition" tree. In one embodiment, displaying the representation of the variable in the window may include displaying one or more locations where the variable is deployed. Thus, in one embodiment, the variable (or a representation of the variable), e.g., the "Temperature" variable of the above example, may be displayed under or proximate to the hardware on which it is deployed. Note that the Temperature variable may also displayed in the source tree. Moreover, other variables may also displayed in the source tree, but in the system definition tree may be displayed under or proximate to a different target device. In other words, each variable may be displayed under the target device (including, for example, virtual devices and/or emulators) on which it is deployed. Note that in other embodiments, instead of displaying the variables in trees, the variables may be displayed in tables, lists, or diagrams, as desired.

In some embodiments, a variable may be deployed to multiple targets simultaneously. A program may reference one or more of the deployed instances of the variable.

Thus, for large distributed systems where users need to keep track of large numbers of variables that are spread out over numerous machines, the project window (or functional equivalent) may help the user keep track of variables and the locations to which they are deployed.

As noted above, the displayed variables are preferably selectable from the window, e.g., the project window, for inclusion in one or more programs, e.g., text-based programs and/or graphical programs. For example, in the case of graphical programs, the user may select the variable with a pointing device, and may drag and drop the variable onto the graphical program or block diagram, creating a reference to the variable in accordance with the current configuration. In other words, when a user drops a variable onto a block diagram, a usage of the variable may be created, where the usage of the variable has the appropriate implementation scripted underneath it. As described above, a user may reconfigure a variable such that its underlying implementation changes, in which case all of the usages of the variable are preferably updated accordingly.

In some embodiments, if the user creates a reference, e.g., by dragging and dropping the variable from the source tree onto a block diagram, and the variable has not yet been instantiated or deployed, a new instance of the variable may automatically be created, e.g., on the local or host computer, or some default device specified by the user, where the new reference may access the new instance of the variable.

Thus, various embodiments of the systems and methods described above may unite a number of different communications protocols and APIs under a single abstraction, e.g., variable abstraction, where users may create and/or configure (and re-configure) variables through a configuration dialog, and may select the communication characteristics they desire. Moreover, upon configuration of the variable, all deployments of the variable may be automatically updated, whether they are in the same program, in different programs on the same machine, or in different programs on different machines.

BRIEF DESCRIPTION OF THE DRAWINGS

A better understanding of the present invention can be obtained when the following detailed description of the preferred embodiment is considered in conjunction with the following drawings, in which.

Figure 1A:
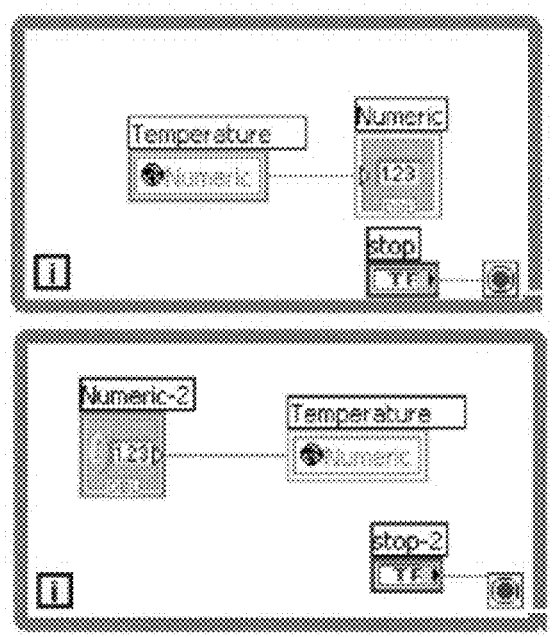
FIGS. 1A and 1B illustrate prior art specification and use of variables.
Figure 1B:
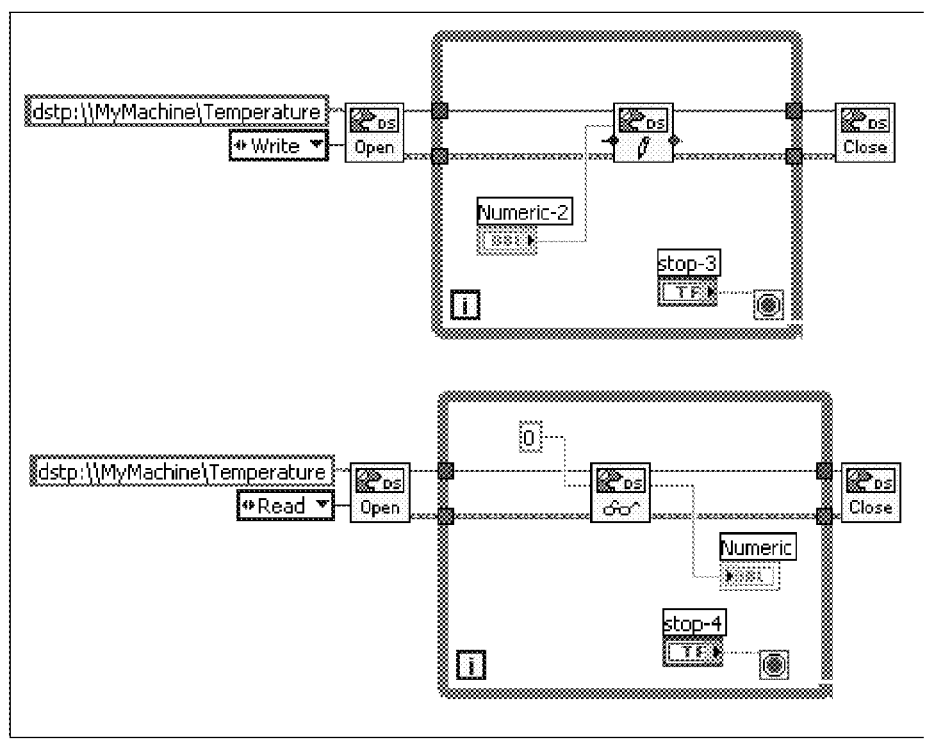

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. application Ser. No. 11/037,575 titled "Variable Abstraction", filed Jan. 18, 2005.

U.S. Provisional Application Ser. No. 60/602,214 titled "Variable Abstraction", filed Aug. 17, 2004.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000, currently pending.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Figure 2A:
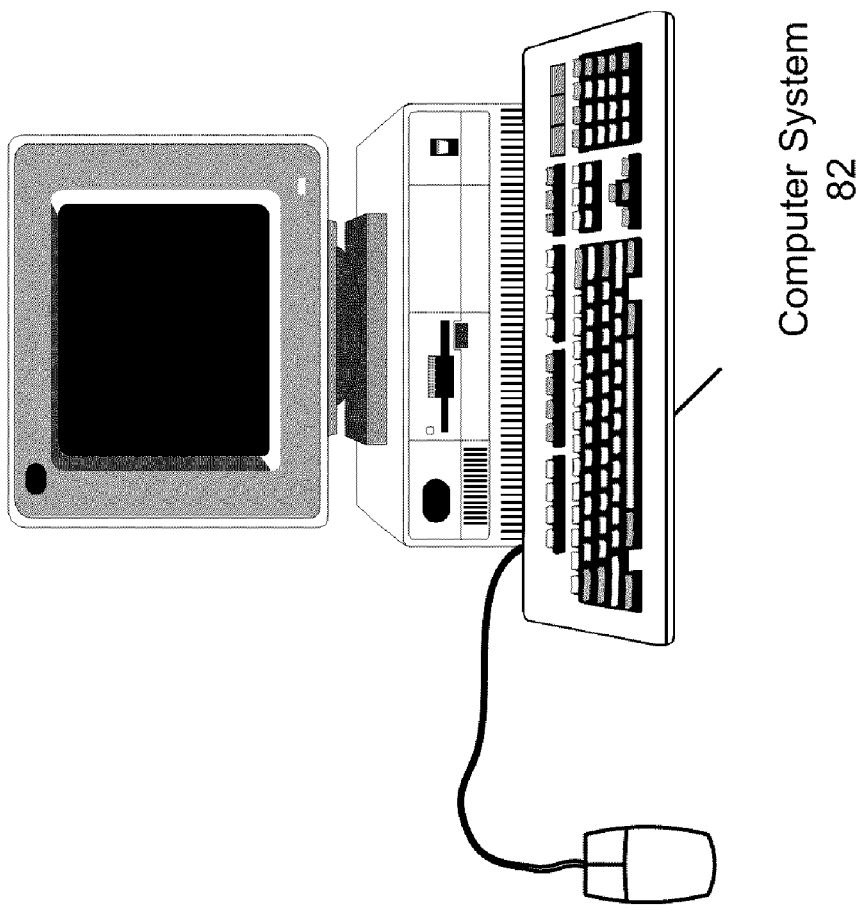
FIG. 2A illustrates a computer system operable to execute a graphical program according to an embodiment of the present invention.

FIG. 2A—Computer System

FIG. 2A illustrates a computer system 82 operable to execute program instructions implementing embodiments of the present invention. Various embodiments of a system and method for specifying, configuring, representing, and using variables in programs are described below.

As shown in FIG. 2A, the computer system 82 may include a display device operable to display an interface, such as a graphical user interface (GUI), facilitating interactions between a user and software executing on the computer system 82. For example, the graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more programs, e.g., text-based programs or graphical programs, which are executable to perform the methods described herein. Also, the memory medium may store a programming development environment application used to create and/or execute such programs, also referred to as an integrated development environment (IDE). The memory medium may also store operating system software, as well as other software for operation of the computer system. Various embodiments further include receiving or storing instructions and/or data implemented in accordance with the foregoing description upon a carrier medium.

Figure 2B:
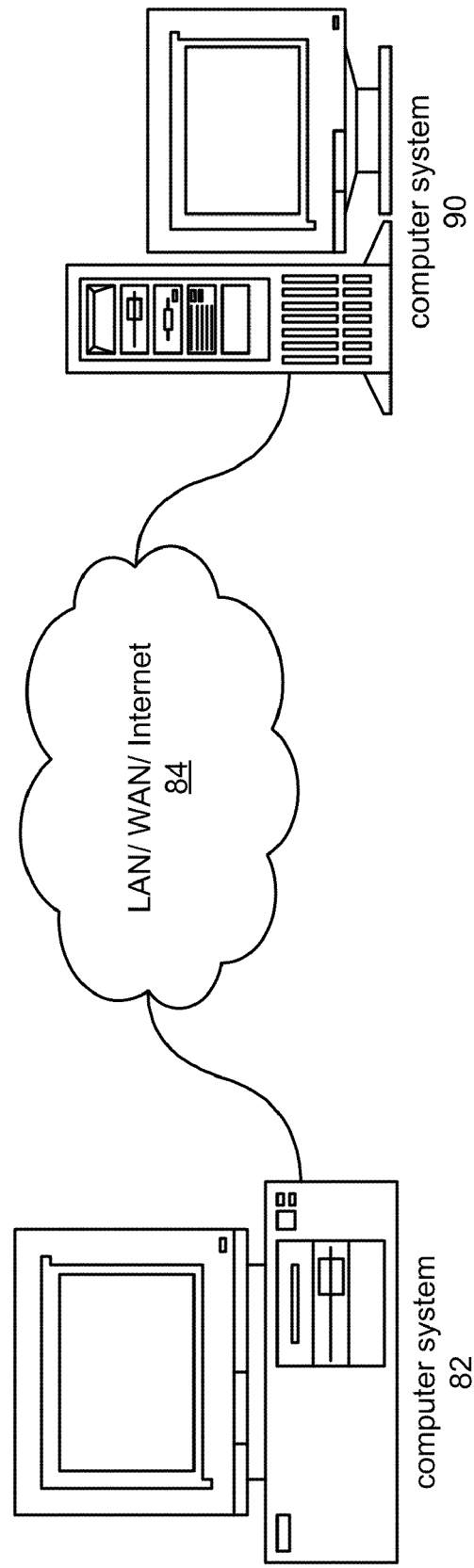
FIG. 2B illustrates a network system comprising two or more computer systems that may implement an embodiment of the present invention.

FIG. 2B—Computer Network

FIG. 2B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, computer 82 may execute a first portion of the program and computer system 90 may execute a second portion of the program. As another example, computer 82 may display the user interface of a program and computer system 90 may execute the functional or application portion of the program.

In some embodiments, the program development environment or integrated development environment (IDE) may be the LabVIEW graphical program development environment provide by National Instruments Corporation, and the programs described herein may be graphical programs developed in the "G" graphical programming language also provided by National Instruments Corporation, although the techniques described herein are broadly applicable to any type of program, including text-based programs, such as, for example, C, C++, and JAVA, among others. For example, as described above in the glossary of terms, a graphical program comprises a plurality of interconnected nodes or icons, wherein the plurality of interconnected nodes or icons visually indicate functionality of the program. These interconnected nodes form a block diagram. In some cases, the graphical program may also include a user interface portion, referred to as a front panel, which includes one or more controls or indicators for human interaction with the program. Further details regarding graphical programming may be found in the patents incorporated by reference above.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 3A:
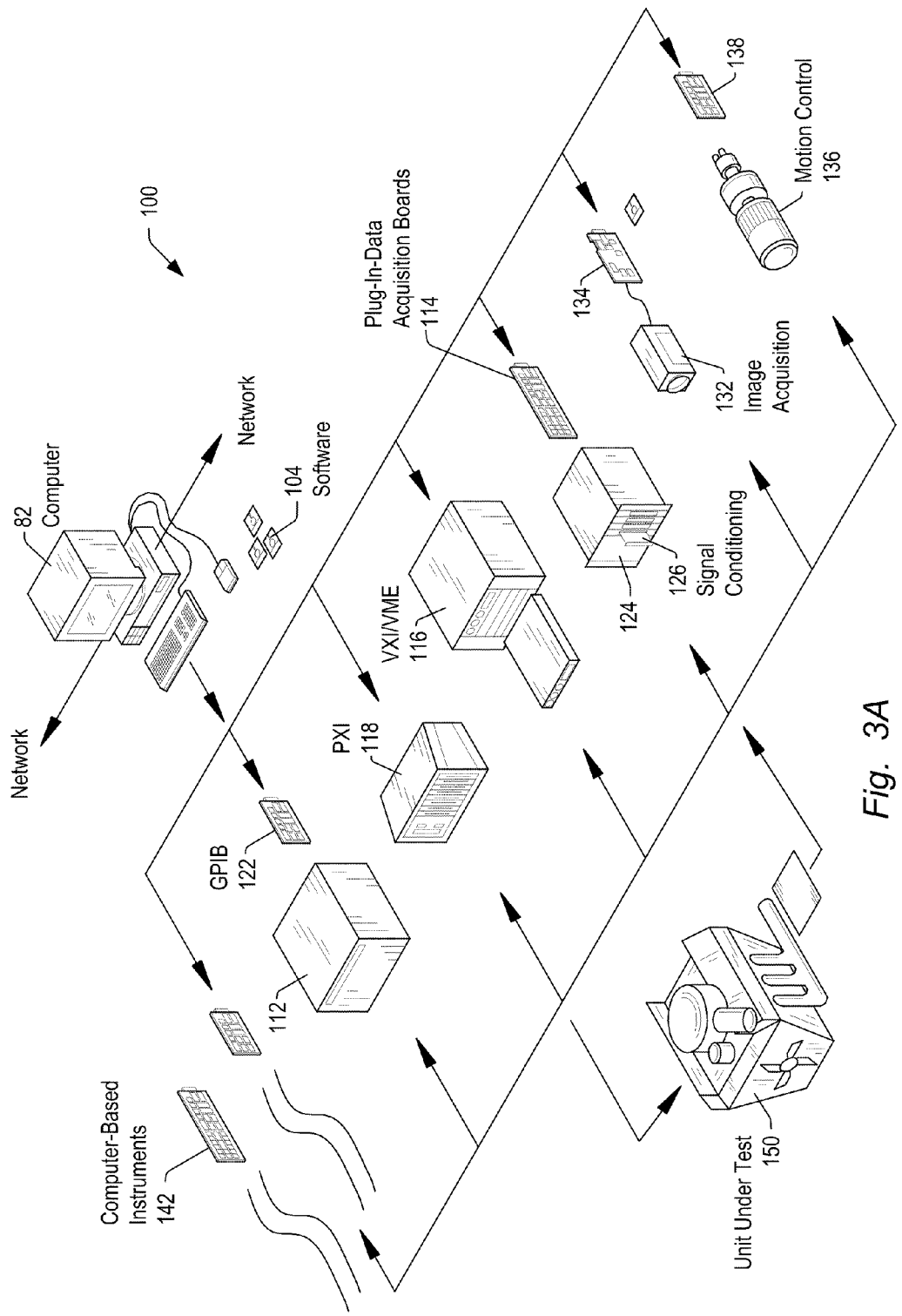
FIG. 3A illustrates an instrumentation control system according to one embodiment of the invention.

FIG. 3A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others. While the techniques described herein are illustrated in terms of various industrial applications, it should be noted that they are broadly applicable to any program application or domain.

Figure 3B:
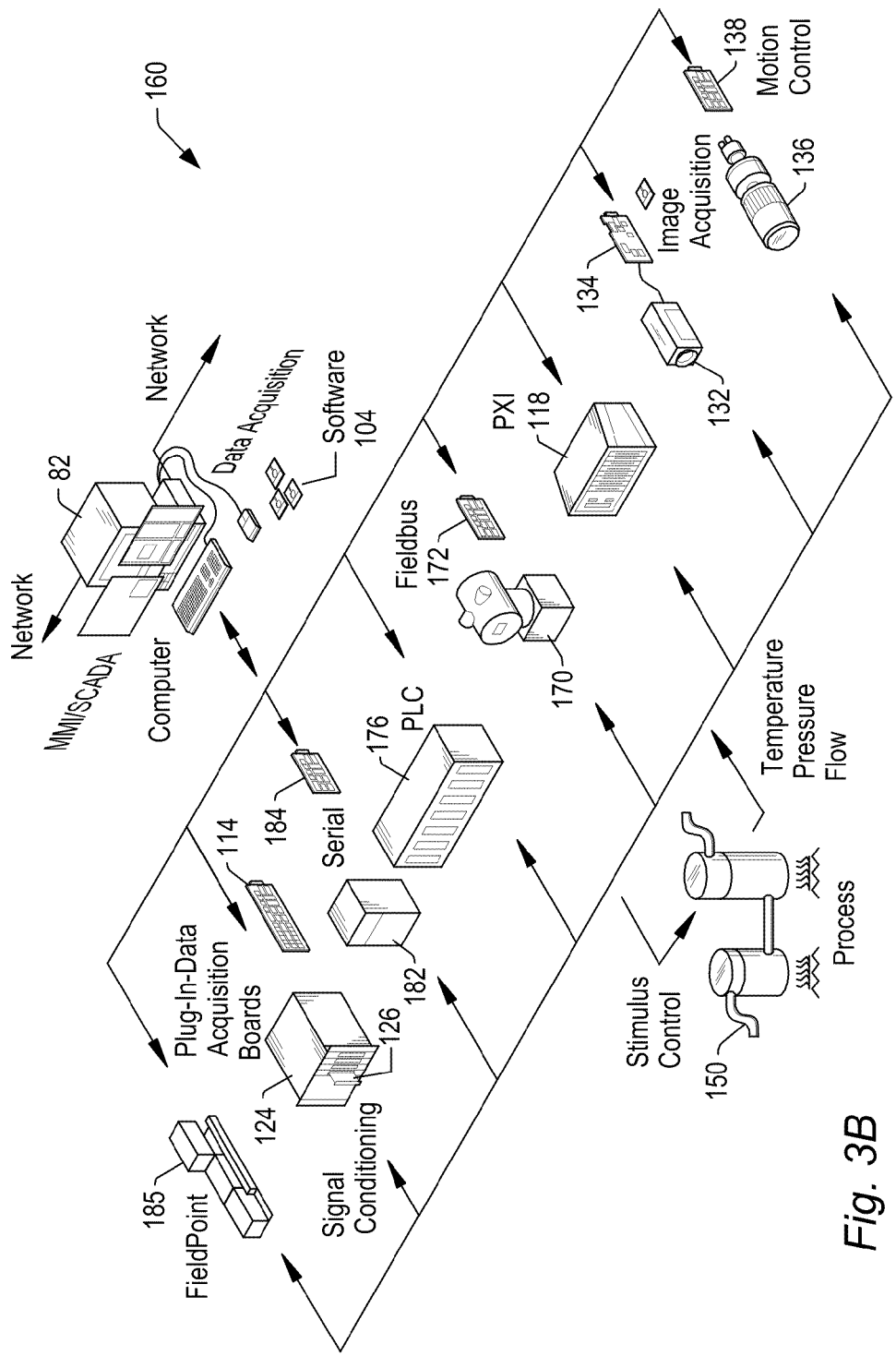
FIG. 3B illustrates an industrial automation system according to one embodiment of the invention.

FIG. 3B illustrates an exemplary industrial automation system 160 which may implement embodiments of the invention. The industrial automation system 160 is similar to the instrumentation or test and measurement system 100 shown in FIG. 3A. Elements which are similar or identical to elements in FIG. 3A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 4:
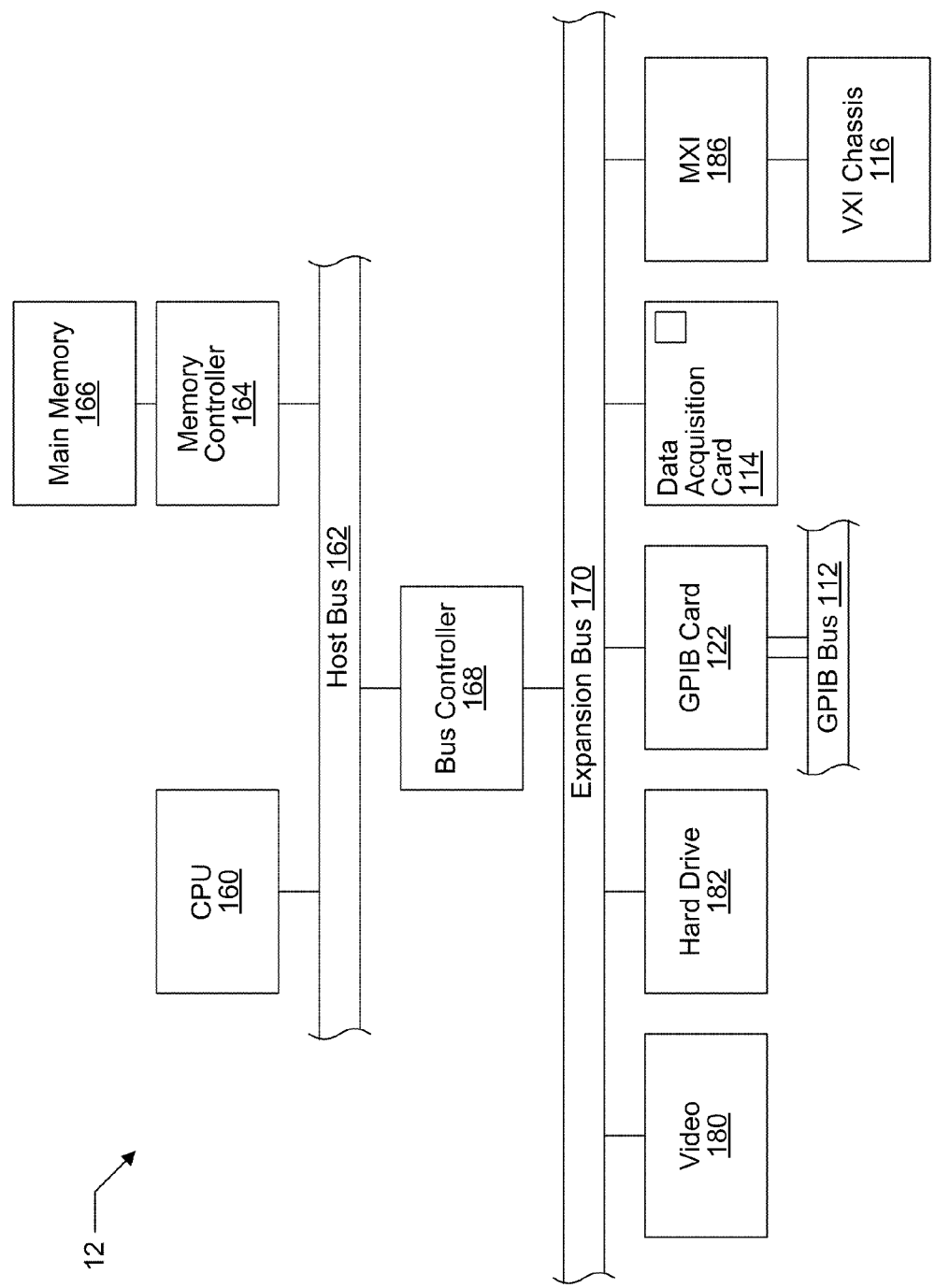
FIG. 4 is an exemplary block diagram of the computer systems of FIGS. 2A, 2B, 3A and 3B.

FIG. 4—Computer System Block Diagram

FIG. 4 is a block diagram representing one embodiment of the computer system 82 and/or 90 illustrated in FIGS. 2A and 2B, or computer system 82 shown in FIG. 3A or 3B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store a program development environment and one or more programs in accordance with various embodiments of the present invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a program to the device 190 for execution of the program on the device 190. The deployed program may take the form of a text-based program, or may comprise a graphical program. The deployed graphical program may comprise graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
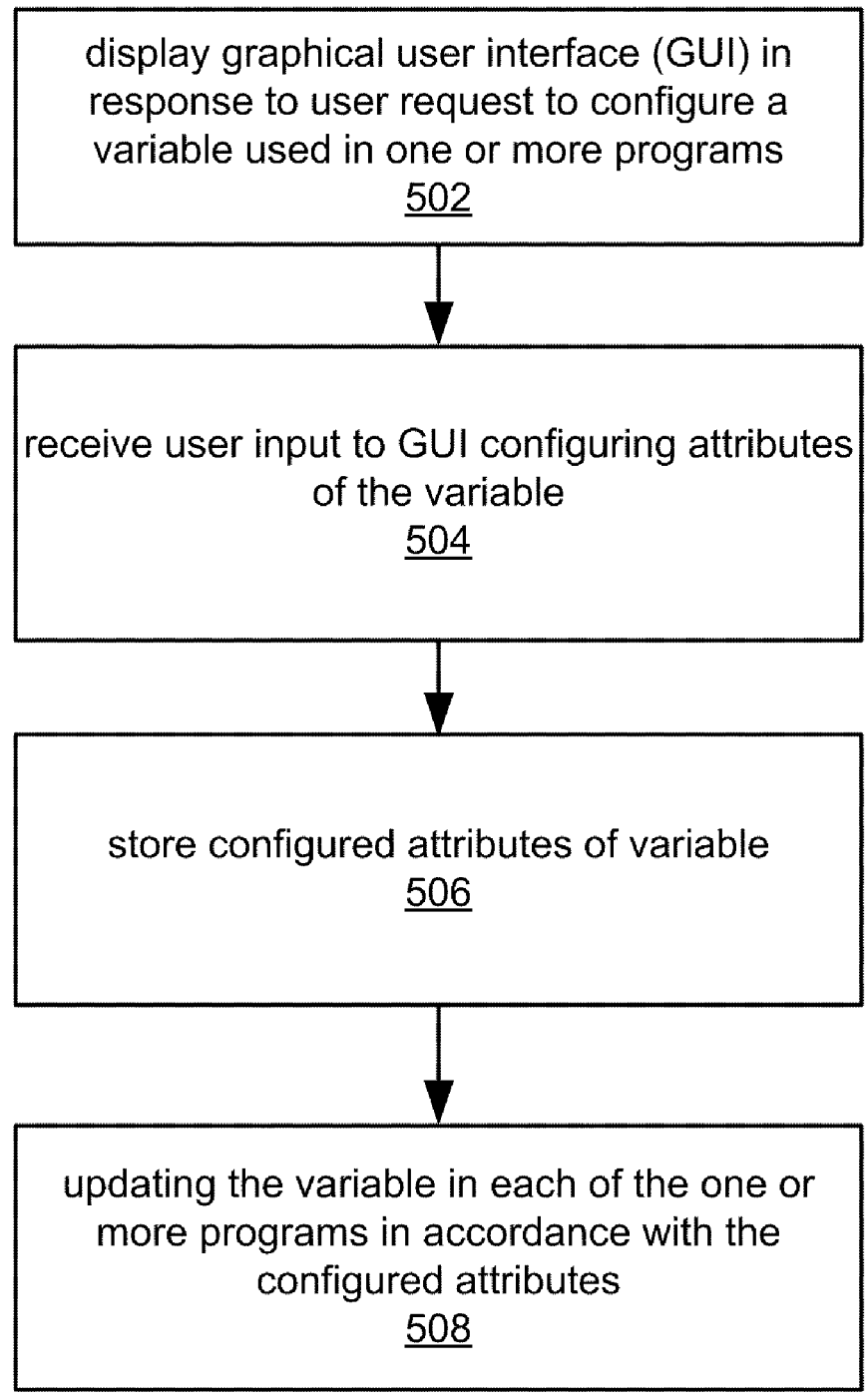
FIG. 5 is a flowchart diagram illustrating one embodiment of a method for configuring a variable.

FIG. 5—Method for Configuring a Variable

FIG. 5 flowcharts one embodiment of a method for configuring a variable for use in one or more programs. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

Figure 6:
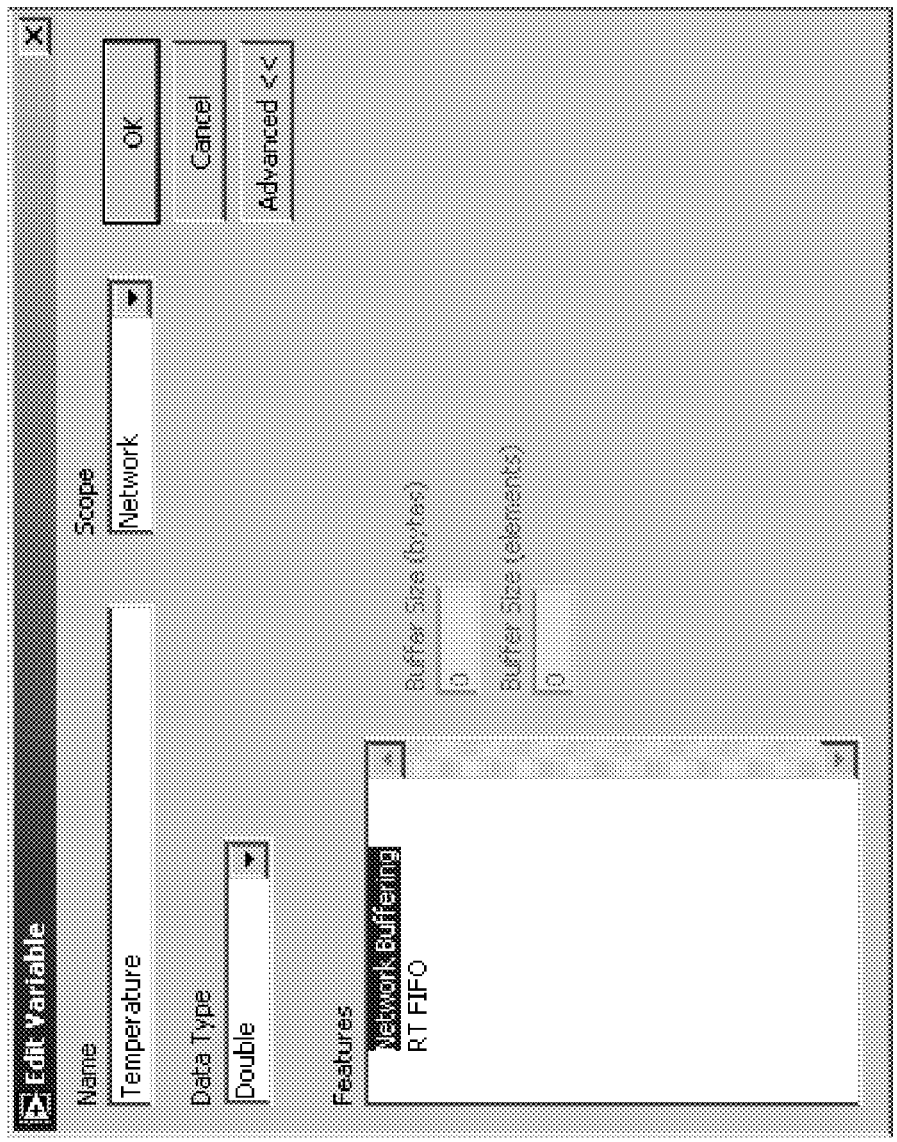
FIG. 6 illustrates one embodiment of a graphical user interface (GUI) for configuring a variable.

In 502, a graphical user interface (GUI) may be displayed in response to user input requesting configuration of a variable, where the variable is included in one or more programs, where, as noted above, the programs may be text-based programs or graphical programs, and may be on a single machine or on a plurality of devices coupled via a network. FIG. 6 illustrates one embodiment of such a GUI, although it should be noted that the GUI of FIG. 6 is meant to be exemplary only, and is not intended to limit the GUI to any particular form, function, or appearance.

In 504, user input to the GUI configuring attributes of the variable may be received. In preferred embodiments, the attributes may include one or more of: name, data type, and scope. In one embodiment, the scope may be specified as local, global, or network, where network scope refers to a variable scope spanning a plurality of machines coupled together over a network.

As FIG. 6 shows, the example GUI includes various fields for specifying these attributes, where, as may be seen, the user has specified a variable with the name "Temperature", of data type "Double", and with "Network" scope. As shown in the example GUI of FIG. 6, in some embodiments, additional (optional) fields or controls may also be provided. For example, depending upon the attributes specified, e.g., data type or scope, options or fields for specifying additional attributes may be presented, such as the "Features" list shown in the bottom left portion of the GUI. These features, namely "Network Buffering" and "RT FIFO" correspond to the network scope of the variable. As shown, the user has selected "Network Buffering", which refers to storage used in communicating the variable's value over the network. As also shown, corresponding to this feature, controls may be provided for setting the buffer size, e.g., in terms of size in bytes, or number of elements. Thus, in some embodiments, the GUI may display different and/or additional fields or controls based on the specified attributes.

In this example, an "Advanced" button is also provided whereby the user may invoke additional dialogs for specifying further attributes of or related to the variable. For example, in one embodiment, the user may be allowed to specify a particular communication protocol for implementing the network-scoped variable, e.g., DataSocket, Logos, or TCP, among others.

In some embodiments, the term "scope" may have a slightly different meaning than that traditionally associated with program variables. For example, the scope specified in 504 may refer to the scope of the variable definition and the access domain of any instance of the variable based on the definition. Thus, if the user specifies that the variable being defined have network scope, the variable definition applies across any machines on the network. Similarly, any instances of the variable, i.e., instantiations of the defined variable, are accessible to any program on any device on the network. In other words, any program on any device in the network may include references to the variable that may access some shared memory location to which the variable has been deployed. Said another way, once the variable definition has been specified, the user may deploy the variable to a particular location, e.g., to a memory location on a hardware device, such as computer 82, or any other device coupled to the network. The value of the deployed variable is thus stored at this memory location. References to this instance of the variable (as defined by the variable definition) may then be used in any programs, subject to the specified scope, where the scope is considered with respect to the deployment location. For example, if a globally scoped variable is deployed to a particular device, say, device A, then that variable may only be accessed by programs executing on device A.

Note that there may be multiple instantiations and deployments of variables based on the same variable definition. For example, in addition to the variable deployment to device A mentioned above, a second instance of the variable may be deployed to device B, which may then only be accessed by programs on device B. Because of the global scope, the respective programs on each of the devices (A and B) may only "see" their respective deployed variable instance. However, in cases where the deployed variable instances are specified with network scope, regardless of the particular deployment locations (as long as they are on the network), any programs on any devices may access both of the variable instances. Thus, although the variables may have the same visible name, some type of scope resolution may be required whereby the particular variable instance (deployment) may be specified for reference. For example, in one embodiment, the variable instances may include scope resolution or deployment information, e.g., an instance designation, which may be used to distinguish between multiple instances of the variable.

It should be noted that in addition to scope, access to a particular instance of a variable may also be constrained to specific devices on the network. For example, this type of constraint may be specified by security configurations, such as for example, a list of devices or programs or users which may be allowed access.

In 506, the configured attributes may be stored, e.g., in non-volatile memory and/or RAM of the host computer 82, or of another computer or device coupled to the computer, e.g., over a network.

Finally, in 508, the variable may be updated in each of the one or more programs in accordance with the configured attributes. In other words, everywhere the variable has been instantiated and referenced, i.e., in different programs, possibly across multiple devices over the network, the instances and references of the variable, along with any underlying implementation mechanisms and/or protocols, may be automatically updated to reflect the specified configuration.

In some cases, at least one of the one or more programs may be incompatible with the configured variable, in which case an error condition may be indicated for the at least one of the one or more programs. For example, in one embodiment, indicating an error condition for the at least one of the one or more programs may include providing information relating to one or more portions of the program that are incompatible with the configured variable. The at least one of the one or more programs may then be modified in response to user input, where the modified at least one program is compatible with the configured variable. Said another way, if an error is reported or otherwise indicated for one or the program instances due to incompatibility with the new variable configuration, the user may edit the program to correct the error condition. Of course, in some cases the user may also reconfigure the variable, i.e., configure the variable differently, to remove the error condition.

The error condition may be indicated in any of a variety of ways. For example, a text message describing the error may be presented to the user, or an error code presented, whereby the user may look up the error description. In some embodiments, the error may be indicated graphically, e.g., if the method determines that there are incompatible or invalid portions of the program, the incompatible portions may be graphically indicated, e.g., the graphical program may be displayed with broken wires indicating the incompatible portion or portions. In other embodiments, the incompatible portions may be indicated via modified icons, color-coding, shading, boundary lines, or via any other type of graphical indicator. In yet another embodiment, the invalid portions may be indicated via text, e.g., via labels displayed next to the respective portions, and so forth.

In one embodiment, information indicating how the incompatible portions can be modified or replaced to enable proper use of the variable may be provided to the user, after which the user may modify the program accordingly.

In some embodiments, the basic approach described above may also be used to create and specify the variable. In other words, in some embodiments, the method of FIG. 5 may also include creating the variable, e.g., with default or user-specified attributes. For example, creating the variable may include displaying the graphical user interface (GUI) in response to user input requesting creation of the variable. In some embodiments, the variable may be created with a default configuration of the attributes of the variable. If the user is satisfied with the default variables, no further configuration may be necessary. However, if there is no default configuration, or if further configuration is required, then, as described above with reference to FIG. 5, user input to the GUI may be received specifying the attributes of the variable. As described above, the attributes may include one or more of: name, data type, and scope. The specified (or default) attributes may be stored.

Once the variable has been specified, a representation of the variable may be displayed, where the variable is selectable via the representation for inclusion in the one or more programs. For example, the representation of the variable may include the name of the variable and/or an icon for the variable. An example of such a representation and its display is described below with reference to FIG. 8.

Figure 7:
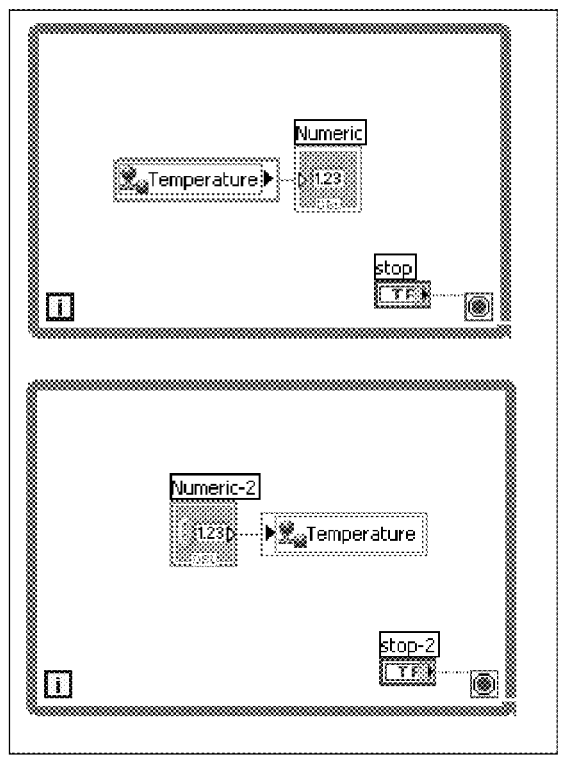
FIG. 7 illustrates using a variable in one or more programs, according to one embodiment.

FIG. 7—Using Variables in Programs

Once the variable has been specified, the variable may be instantiated, and references to the variable included in the one or more programs in response to user input. In other words, the variable may be instantiated based on the variable definition, and deployed to some (possibly shared) memory location, after which one or more programs may reference the variable. FIG. 7 illustrates use of a variable in separate looping structures, according to one embodiment. Note that the two loops may be in the same program, in different programs on the same machine, or in different programs on different machines. Note that the variable is simply declared and used in the loops (programs), with no external or visible indication of the underlying implementation. Note also, however, that in the embodiment shown in FIG. 7, the variable node or icon does indicate some configuration information of the variable, specifically, the network scope of the variable, as indicated by the network icon displayed just to the left of the variable name.

Thus, as indicated above, once the variable is configured and instantiated it may be used on or in one or more programs, e.g., block diagrams or graphical program, with a simple single point API. Note that regardless of the configuration changes made to the variable, the usage in the program(s), e.g., in or on the block diagram(s) may always be the same. In other words, the usage of the variable may not change, even if the underlying implementation of the variable changes.

Thus, for example, in a graphical program embodiment, the underlying implementation for a variable may be scripted under the node visible to the user. If a user creates a variable and specifies a global scope, the underlying implementation may use a traditional global variable (as illustrated in FIG. 1A). If a user selects a network scope, the underlying implementation may use a mechanism and protocol accordingly, e.g., DataSocket or Logos.

Once the variable has been configured and deployed, or deployed and configured, the program or programs that include or reference the configured variable may be executed, where the variable usages, instances, or references in each program exist and behave in accordance with the configuration. As noted above, the program or programs may be text-based or graphical, and may be directed to any type of application domain, as desired. For example, the program may be operable to perform one or more of: an industrial automation function, a process control function, and/or a test and measurement function, among others.

Figure 8:
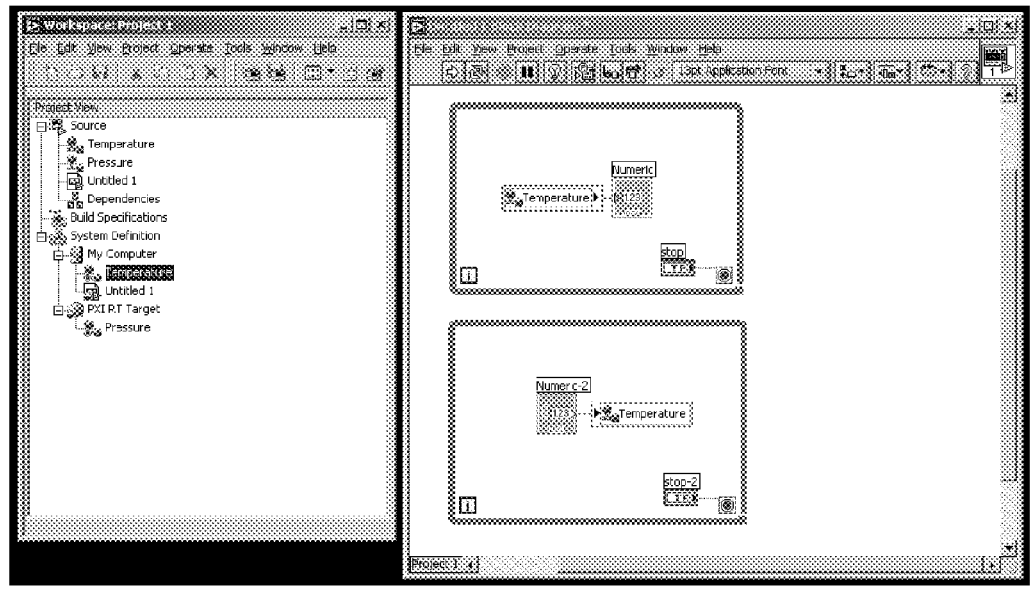
FIG. 8 illustrates one embodiment of a GUI for displaying, selecting, and deploying a variable to one or more programs.

FIG. 8—Displaying and Selecting the Variable for Use

As noted above, in some embodiments, once the variable has been specified or configured, a representation of the variable may be displayed, where the representation of the variable is selectable by the user to include the variable in a program. For example, in some embodiments, displaying a representation of the variable may include displaying the representation of the variable in a window, where the representation is selectable via user input to the window.

FIG. 8 illustrates one embodiment of a GUI for displaying and selecting variables, e.g., for use in a program or programs, and/or for configuring the variable. As FIG. 8 shows, in this embodiment, the GUI includes a window for displaying and editing a program or programs, as well as a project window which may display resources related to or useable by or in the program(s). For example, as shown, the project window may display software resources, e.g., in a "source" tree, and may further display hardware resources, e.g., in a "system definition" tree. Thus, resource trees may be used to display representations of the variable.

In one embodiment, displaying the representation of the variable in the window may include displaying one or more locations where the variable is deployed. Thus, as FIG. 8 indicates, in one embodiment, the variable (or a representation of the variable), e.g., the "Temperature" variable of the above examples, may be displayed under or proximate to the hardware on which it is deployed. Note that the Temperature variable is also displayed in the source tree. Moreover, in this particular example, another variable, "Pressure" is also displayed in the source tree, but in the system definition tree is displayed under or proximate to a PXI RT Target element in the tree. In other words, each variable may be displayed under the target device (including, for example, virtual devices and/or emulators) on which it is deployed. Note that as mentioned above, multiple instances of the variable may be deployed onto different respective devices.

Thus, for large distributed systems where users need to keep track of large numbers of variables that are spread out over numerous machines, the project window (or functional equivalent) may help the user keep track of variables and the locations to which they are deployed.

It should be noted that the particular embodiment shown in FIG. 8 is meant to be exemplary only, and is not intended to limit the variable representation or display to any particular form, function, or appearance. For example, instead of displaying the variables in trees, the variables may be displayed in tables, lists, diagrams, and so forth, as desired.

As noted above, the displayed variables are preferably selectable from the window, e.g., the project window, for inclusion in one or more programs, e.g., text-based programs and/or graphical programs. For example, in the case of graphical programs, the user may select the variable with a pointing device, and may drag and drop the variable onto the graphical program or block diagram, thereby creating a reference to the variable, i.e., creating a "usage" of the variable, in accordance with the current configuration. In other words, when a user drops a variable onto a block diagram, a usage of the variable may be created, where the usage of the variable has the appropriate implementation scripted underneath it. As described above, a user may reconfigure a variable such that its underlying implementation changes, in which case all of the usages of the variable are preferably updated accordingly.

In some embodiments, if the user creates a reference, e.g., by dragging and dropping the variable from the source tree onto a block diagram, and the variable has not yet been instantiated or deployed, a new instance of the variable may automatically be created, e.g., on the local or host computer, or some default device specified by the user, where the new reference may access the new instance of the variable.

Graphical Programs and Programming

As noted above, in some embodiments, the programs described herein may be graphical programs. A graphical program may be created on the computer system 82 (or on a different computer system) in the following manner.

The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a graphical data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created in 262 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired.

In some embodiments where the graphical program comprises a block diagram portion and a user interface portion, during execution of the graphical program, the graphical user interface is displayed on a display of a first computer system and the block diagram executes on a second computer system.

Thus, various embodiments of the systems and methods described above may unite a number of different communications protocols and APIs under a single abstraction, e.g., variable abstraction, where users may create and/or configure (and re-configure) variables through a configuration dialog, and may select the communication characteristics they desire. Moreover, upon configuration of the variable, all deployments of the variable may be automatically updated, whether they are in the same program, in different programs on the same machine, or in different programs on different machines.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer-readable memory medium comprising program instructions for configuring a variable for use in a plurality of graphical programs, wherein each of the plurality of graphical programs comprises a plurality of interconnected nodes that visually indicate functionality of the graphical program, and wherein the program instructions are executable to:
    display a representation of a variable, wherein the representation of the variable comprises an icon, wherein the variable is selectable via the representation for inclusion in the plurality of graphical programs, wherein the variable comprises a specification of a named memory location for storing one or more values, and wherein the variable does not store or reference program instructions;
    display a graphical user interface (GUI) in response to user input requesting configuration of the variable, wherein the variable is comprised in the plurality of graphical programs;
    receive user input to the GUI configuring attributes of the variable, wherein the attributes comprise one or more of:
    name;
    data type; or
    scope;
    store the configured attributes; and
    update the variable in each of the plurality of graphical programs in accordance with the configured attributes, thereby configuring the variable.

2. The non-transitory computer-readable memory medium of claim 1, wherein the scope comprises one of:
    local;
    global; or
    network.

3. The non-transitory computer-readable memory medium of claim 1, wherein the program instructions are further executable to:
    include the variable in the plurality of graphical programs in response to user input selecting the representation of the variable.

4. The non-transitory computer-readable memory medium of claim 3, wherein at least one of the plurality of graphical programs is incompatible with the configured variable, wherein the program instructions are further executable to:

indicate an error condition for the at least one of the plurality of graphical programs.

5. The non-transitory computer-readable memory medium of claim 4, wherein to indicate an error condition for the at least one of the plurality of graphical programs, the program instructions are executable to:

provide information relating to one or more portions of the at least one of the graphical programs that are incompatible with the configured variable.

6. The non-transitory computer-readable memory medium of claim 5, wherein the program instructions are further executable to:

modify the at least one of the plurality of graphical programs in response to user input, wherein the modified at least one graphical program is compatible with the configured variable.

7. The non-transitory computer-readable memory medium of claim 3, wherein to include the variable in the plurality of graphical programs, the program instructions are executable to:

create a plurality of variable references in the plurality of graphical programs, wherein the variable is deployed at a memory location, and wherein the plurality of variable references in the plurality of graphical programs operate to access the memory location.

8. The non-transitory computer-readable memory medium of claim 3, wherein to include the variable in the plurality of graphical programs, the program instructions are executable to:

modify the plurality of graphical programs to access the variable based on respective target platforms of the plurality of graphical programs.

9. The non-transitory computer-readable memory medium of claim 1, wherein the program instructions are further executable to:

display locations where the variable is deployed.

10. The non-transitory computer-readable memory medium of claim 9, wherein to display locations where the variable is deployed, the program instructions are executable to:

display the variable in one or more resource trees.

11. The non-transitory computer-readable memory medium of claim 1, wherein prior to said configuring attributes of the variable, the variable has a default configuration of the attributes of the variable.

12. The non-transitory computer-readable memory medium of claim 1, wherein the plurality of graphical programs are comprised on a plurality of devices coupled via a network.

13. A method for configuring a variable for use in a plurality of graphical programs, wherein each of the plurality of graphical programs comprises a plurality of interconnected nodes that visually indicate functionality of the graphical program, and the method comprising:

utilizing a computer to perform:

displaying a representation of a variable, wherein the representation of the variable comprises an icon, wherein the variable is selectable via the representation for inclusion in the plurality of graphical programs, wherein the variable comprises a specification of a named memory location for storing one or more values, and wherein the variable does not store or reference program instructions;

displaying a graphical user interface (GUI) in response to user input requesting configuration of the variable, wherein the variable is comprised in the plurality of graphical programs;

receiving user input to the GUI configuring attributes of the variable, wherein the attributes comprise one or more of:

name;
data type; or
scope;

storing the configured attributes; and updating the variable in each of the plurality of graphical programs in accordance with the configured attributes.

14. The method of claim 13, the method further comprising:

utilizing the computer to perform:

including the variable in the plurality of graphical programs in response to user input.

15. The method of claim 14, wherein said including the variable in the plurality of graphical programs comprises:

creating a plurality of variable references in the plurality of graphical programs, wherein the variable is deployed at a memory location, and wherein the plurality of variable references in the plurality of graphical programs operate to access the memory location.

16. The method of claim 13, further comprising: utilizing the computer to perform:

displaying locations where the variable is deployed.

17. A system for configuring a variable for use in a plurality of graphical programs, wherein each of the plurality of graphical programs comprises a plurality of interconnected nodes that visually indicate functionality of the graphical program, the system comprising:

a processor;
a memory medium coupled to the processor; and
a display device coupled to the processor and the memory medium;

wherein the memory medium stores program instructions which are executable by the processor to:

display a representation of a variable, wherein the representation of the variable comprises an icon, wherein the variable is selectable via the representation for inclusion in the plurality of graphical programs, wherein the variable comprises a specification of a named memory location for storing one or more values, and wherein the variable does not store or reference program instructions;

display a graphical user interface (GUI) in response to user input requesting configuration of the variable, wherein the variable is comprised in the plurality of graphical programs;

receive user input to the GUI configuring attributes of the variable, wherein the attributes comprise one or more of:

name;
data type; or
scope;

store the configured attributes; and update the variable in each of the plurality of graphical programs in accordance with the configured attributes.

* * * * *